United States Patent
Meyer et al.

(10) Patent No.: US 10,584,711 B2
(45) Date of Patent: Mar. 10, 2020

(54) ONE-PIECE LABYRINTH DISC CHAMBER FOR CENTRIFUGAL WELL PUMP

(71) Applicant: Baker Hughes Incorporated, Houston, TX (US)

(72) Inventors: Aron Meyer, Rison, AR (US); Matthew Majors, Norman, OK (US); Travis Coonce, Claremore, OK (US)

(73) Assignee: Baker Hughes, a GE Company, LLC, Houston, TX (US)

( * ) Notice: Subject to any disclaimer, the term of this patent is extended or adjusted under 35 U.S.C. 154(b) by 381 days.

(21) Appl. No.: 15/398,486

(22) Filed: Jan. 4, 2017

(65) Prior Publication Data

US 2018/0187691 A1 Jul. 5, 2018

(51) Int. Cl.
  *F04D 29/10* (2006.01)
  *F04D 29/06* (2006.01)
  *F04D 29/62* (2006.01)
  *F04D 13/10* (2006.01)

(52) U.S. Cl.
  CPC .......... *F04D 29/106* (2013.01); *F04D 13/10* (2013.01); *F04D 29/061* (2013.01); *F04D 29/628* (2013.01)

(58) Field of Classification Search
  CPC .... F04D 29/106; F04D 29/041; F04D 29/061; F04D 29/126; F04D 29/047; F04D 29/588; F04D 29/58; F04D 29/0476; F04D 13/086; F04D 13/10; F04D 29/10; F04D 29/628; E21B 43/128; F16J 15/4472
  USPC ..................... 277/412; 417/423.3, 423.11-13
  See application file for complete search history.

(56) References Cited

U.S. PATENT DOCUMENTS

| 8,845,308 B2* | 9/2014 | Tetzlaff | F04D 29/0476 417/423.11 |
| 2012/0263610 A1 | 10/2012 | Tetzlaff et al. | |
| 2013/0004344 A1* | 1/2013 | McKinney | E21B 43/128 417/366 |
| 2015/0023805 A1 | 1/2015 | Pyron et al. | |
| 2015/0060042 A1* | 3/2015 | Shilpiekandula | B22F 3/008 166/65.1 |
| 2015/0337843 A1* | 11/2015 | Tanner | F04D 13/10 417/53 |

(Continued)

FOREIGN PATENT DOCUMENTS

WO   2016014059 A1   1/2016

OTHER PUBLICATIONS

International Search Report and Written Opinion dated Mar. 28, 2018 for corresponding PCT/US2017/066176.

*Primary Examiner* — Nathan Cumar
(74) *Attorney, Agent, or Firm* — Bracewell LLP; James E. Bradley (57) ABSTRACT

A submersible well pump assembly includes a seal unit coupled between a pump and a motor. The seal unit has a forward guide member, a rearward guide member, and a labyrinth disc chamber connected between. The labyrinth disc chamber has an outer wall, a concentric guide tube and a number of axially spaced apart discs extending between the guide tube and the outer wall, defining cavities between the discs. Disc ports extend through the discs to communicate fluid between the cavities, the ports being at multiple angular locations relative to each other. A drive shaft extends through the guide tube, the forward guide member bore and the rearward guide member. The outer wall, the guide tube and the discs are made of a single-piece member.

19 Claims, 3 Drawing Sheets

(56) References Cited

U.S. PATENT DOCUMENTS

2016/0145984 A1  5/2016  Tetzlaff et al.

* cited by examiner

ONE-PIECE LABYRINTH DISC CHAMBER FOR CENTRIFUGAL WELL PUMP

FIELD OF THE DISCLOSURE

This disclosure relates in general to electrical submersible well pumps and in particular to a single-piece labyrinth disc chamber for a horizontally oriented pump assembly that retards the migration of well fluid into the motor lubricant.

BACKGROUND

Electrical submersible well pumps ("ESP") are commonly used to produce well fluid from hydrocarbon producing wells. A conventional ESP has a pump operatively coupled to an electrical motor for driving the pump. A pressure equalizer or seal section is normally located between the motor and the pump, but it could also be located at a lower end of the motor. A shaft seal below the pump intake seals the drive shaft extending from the motor. Shaft seals are typically mechanical face seals, thus over time tend to allow a small amount of well fluid to leak into communication with the motor lubricant. The well fluid usually contains water, thus can be damaging to the motor.

In some instances, ESPs are installed in horizontal sections of a well. A labyrinth disc chamber may be employed to further inhibit encroachment of well fluid into contact with the motor lubricant. The labyrinth chamber is made up of a number of discs stacked against one another. The discs are configured to define cavities between them. Each disc has a disc port that allows fluid to flow from one cavity to the next. The disc ports of the discs are arranged at different angular locations relative to the axis so as to require any well fluid to migrate upward and downward along a tortuous flow path. Each disc has a central aperture with a seal that seals against the shaft to require well fluid within the cavities to flow through the disc ports.

SUMMARY

A submersible well pump assembly comprises a labyrinth disc chamber coupled between a pump and a motor. The labyrinth disc chamber has a longitudinal axis and comprises a cylindrical outer wall and a guide tube concentrically located within the outer wall. A plurality of axially spaced apart discs extend between the guide tube and the outer wall, defining cavities between the discs. Disc ports extend through the discs to communicate fluid between the cavities. The disc ports are at multiple angular locations relative to each other. A drive shaft extends through the guide tube. The outer wall, the guide tube and the discs are formed as a single-piece member. The labyrinth disc chamber is an additive manufactured component.

A continuous uninterrupted annular clearance exists between the drive shaft and the guide tube. The annular clearance extends from a forward end to a rearward end of the labyrinth disc chamber.

A forward guide member is secured by threads to a forward end of the labyrinth disc chamber. A forward guide member bore in the forward guide member receives the drive shaft. A forward neck extends from the forward end of the labyrinth disc chamber. The forward neck is a part of the single-piece member and extends into the forward guide member bore. A forward seal ring seals between the forward neck and the forward guide member bore.

An annular clearance between the shaft and the guide tube is in fluid communication with the forward guide member bore.

A forward end annular space is bounded by the rearward end of the forward guide member, a forward one of the discs, the forward neck and the outer wall. A communication passage extends through the forward guide member offset from the forward guide member bore into the forward end annular space. The disc port extending through the forward disc communicates the forward end annular space with a forward one of the cavities.

A rearward guide member is secured by threads to a rearward end of the outer wall. The rearward guide member has a rearward guide member bore through which the drive shaft extends. A rearward neck may extend from a rearward one of the discs into the rearward guide member bore. The rearward neck is part of the single-piece member of the labyrinth chamber. A rearward end annular space is bounded by the forward end of the rearward guide member, the rearward one of the discs, the rearward neck and the outer wall. A rearward communication passage extends through the rearward guide member offset from the rearward guide member bore into the rearward end annular space. The disc port extending through the rearward disc communicates the rearward end annular space with a rearward one of the cavities.

In the embodiment shown, a forward bellows is located between the labyrinth disc chamber and the pump. A forward bellows well fluid port delivers well fluid to one side of the forward bellows. A seal unit fluid is located on an opposite side of the forward bellows. A communication path for the seal unit fluid extends from the opposite side of the forward bellows through the disc ports and the cavities of the labyrinth chamber.

DETAILED DESCRIPTION OF THE DISCLOSURE

The method and system of the present disclosure will now be described more fully hereinafter with reference to the accompanying drawings in which embodiments are shown. The method and system of the present disclosure may be in many different forms and should not be construed as limited to the illustrated embodiments set forth herein; rather, these embodiments are provided so that this disclosure will be thorough and complete, and will fully convey its scope to those skilled in the art. Like numbers refer to like elements throughout. In an embodiment, usage of the term "about" includes +/−5% of the cited magnitude. In an embodiment, usage of the term "substantially" includes +/−5% of the cited magnitude.

It is to be further understood that the scope of the present disclosure is not limited to the exact details of construction, operation, exact materials, or embodiments shown and described, as modifications and equivalents will be apparent to one skilled in the art. In the drawings and specification, there have been disclosed illustrative embodiments and, although specific terms are employed, they are used in a generic and descriptive sense only and not for the purpose of limitation.

Figure 1:
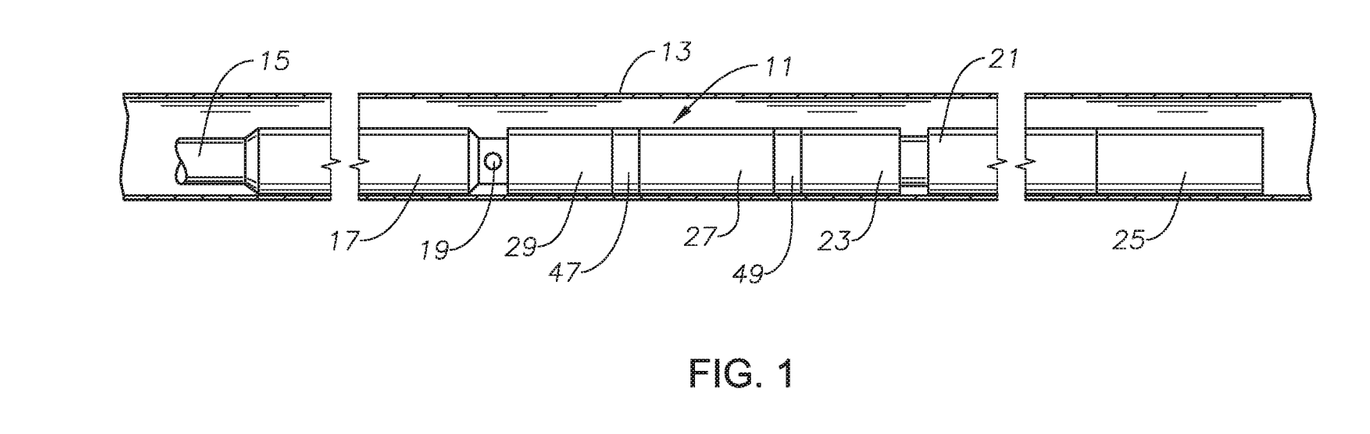
FIG. 1 is a side view of an electrical submersible well pump assembly in a horizontal section of a well and having a labyrinth disc chamber in accordance with this disclosure.

FIG. 1 shows an electrical submersible pump assembly ("ESP") 11 installed in a horizontal section of casing 13 in a well. The well could be a steam assisted gravity drainage well (SAGD). In that type, an operator injects steam into the earth formation through another well located above casing 13 to lower the viscosity of the oil in the formation and cause it to flow downward into openings or perforations in casing 13. ESP 11 pumps the oil along with water from the formation through a string of production tubing 15.

ESP 11 includes a pump 17, which is typically a centrifugal pump, but it could be other types. Pump 17 has an intake 19 for drawing in well fluid. A motor 21 is operatively coupled to pump 17 to drive the pump. Motor 21 is normally a three-phase AC motor. A power cable (not shown) extends alongside production tubing 15 and pump 17 to motor 21.

A thrust bearing unit 23 between pump 17 and motor 21 absorbs down thrust on the pump shaft created by operation of pump 17. Motor 21 and thrust bearing unit 23 are filled with a dielectric motor lubricant to lubricate the bearings. A pressure equalizer reduces a pressure differential between the well fluid in casing 13 and the pressure of the motor lubricant in motor 21 and thrust bearing unit 23. In this example, the pressure equalizer comprises a rearward pressure equalizer 25 secured to the lower or rearward end of motor 21. Alternately, the pressure equalization could be handled by other means, such as a pressure equalizer forward of motor 21 and thrust bearing unit 23.

ESP 11 includes a seal unit 27 to retard the entry of well fluid into contact with the motor lubricant. An optional forward pressure equalizer 29 mounts to the forward end of seal unit 27 to equalize the pressure of seal unit fluid in seal unit 27 with the hydrostatic pressure of the well fluid.

Figure 2:
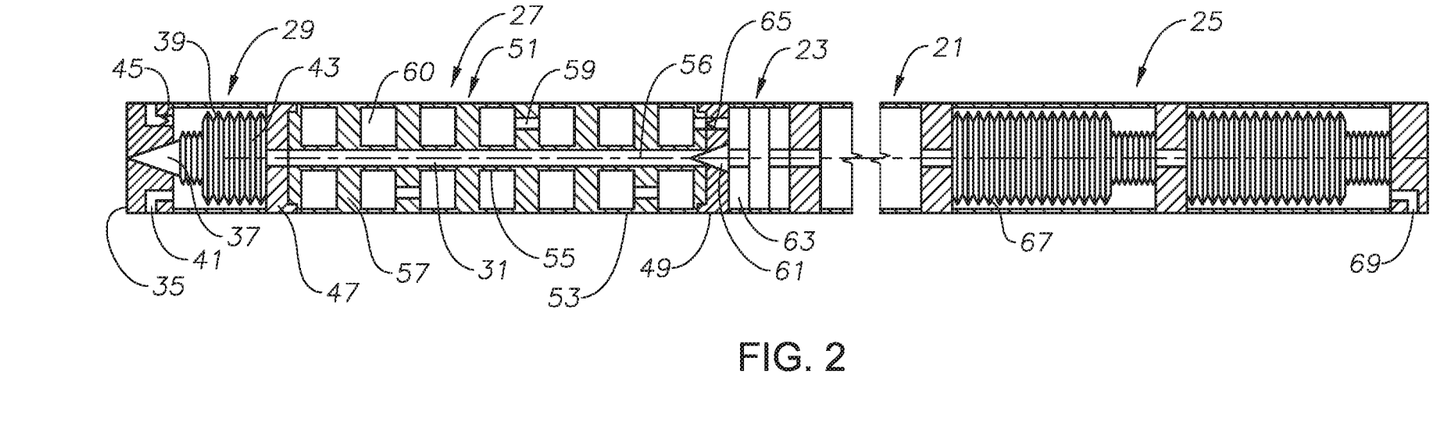
FIG. 2 is a schematic sectional view of the labyrinth disc chamber, motor and below motor pressure equalizer of the pump assembly of FIG. 1.

FIG. 2 is a schematic representation of forward pressure equalizer 29, seal unit 27, thrust bearing unit 23, motor 21 and rearward pressure equalizer 25. Drive shaft 31 extends from motor 21 through thrust bearing unit 23, seal unit 27, and into a head 35. Drive shaft 31 typically comprises a separate drive shaft segment in motor 21 from a segment extending through thrust bearing unit 23 to the forward end of head 35. The segments of drive shaft 31 have splined ends that couple together. Head 35 is a connector that secures to pump intake 19 (FIG. 1) by threads or bolts. The forward end of drive shaft 31 has a splined end that couples to a drive shaft (not shown) in pump 17.

A forward shaft seal 37 of a conventional type, such as a mechanical face seal, mounts around drive shaft 31 in head 35. In this example, the optional forward pressure equalizer 29 comprises a metal bellows 39 that extends and contracts in response to expansion and contraction of the dielectric fluid in the forward pressure equalizer 29. A well fluid inlet port 41 in head 35 admits well fluid to one side of forward bellows 39, which is the exterior side in this embodiment. A seal unit fluid 43, which may be the same as the motor lubricant in motor 21, is located on the opposite side or interior of forward bellows 39. A forward check valve 45 in head 35 expels seal unit fluid 43 from the interior of forward bellows 39 to the exterior of ESP 11 in the event the internal pressure of seal unit fluid 43 exceeds the hydrostatic pressure of well fluid by a selected amount.

Seal unit 27 comprises a forward guide member 47, a rearward guide member 49, and a labyrinth disc chamber 51. Forward guide member 47 is a threaded connector that secures seal unit 27 to the housing of forward pressure equalizer 29. Rearward guide member 49 is a threaded connector that secures seal unit 27 to the housing of thrust bearing unit 23. Labyrinth disc chamber 51 is a single-piece member that includes an cylindrical outer wall 53 and a cylindrical guide tube 55 within and concentric with outer wall 53 along a longitudinal axis 56. Labyrinth disc chamber 51 also includes a plurality of discs 57, each of which extends radially from guide tube 55 to outer wall 53. Discs 57 are normal to axis 56 and axially spaced apart from each other. Disc ports 59 extend through discs 57, communicating seal unit fluid 43 between cavities 60 located between adjacent discs 57. Each cavity 60 has an inner end 60a defined by the outer diameter of guide tube 55. Each cavity 60 has an outer end 60b defined by the inner diameter of chamber outer wall 53. Disc ports 59 are located at various angular locations around axis 56, creating a tortuous up and down flow path for seal unit fluid 43 migrating from forward guide member 47 to rearward guide member 49. The tortuous up and down flow path inhibits the migration of well fluid water that contaminates seal unit fluid 43 because the water will be denser than the seal unit fluid 43.

An optional rearward shaft seal 61 mounts to rearward guide member 49. Rearward shaft seal 61 seals around drive shaft 31, blocking the migration of seal unit fluid 43 into contact with motor lubricant 63 in thrust bearing unit 23. A rearward check valve 65 admits motor lubricant 63 into contact with seal unit fluid 43 in labyrinth disc chamber 51, but will not allow seal unit fluid 43 to migrate into thrust bearing unit 23. Rearward check valve 65 will allow flow of motor lubricant 63 into labyrinth disc chamber 51 if the pressure of motor lubricant 63 exceeds the pressure of seal unit fluid 43 by a selected amount.

In this example, rearward pressure equalizer 25 comprises one or more metal bellows 67 (two shown in tandem) that extend and contract. A well fluid inlet port 69 admits well fluid to one side, shown to be the exterior of rearward bellows 67. The interiors of rearward bellows 67 are filled with motor lubricant 63. If forward bellows 39 is also employed, as shown, it need not have as much capacity as rearward bellows 67 because the quantity of seal unit fluid 43 will normally be less than the quantity of motor lubricant 63.

Because of rearward shaft seal 61, forward bellows 39 pressure equalizes only seal unit fluid 43 while rearward bellows 67 pressure equalizes only motor lubricant 63. If the internal pressure of motor lubricant 63 becomes too high relative to the hydrostatic pressure due to thermal expansion, rearward check valve 65 allows motor lubricant 63 to flow into seal unit 27, which would increase the pressure of seal unit fluid 43. Forward check valve 45 allows that pressure to be relieved by expelling some of the seal unit fluid 43 to the exterior.

Figure 3:
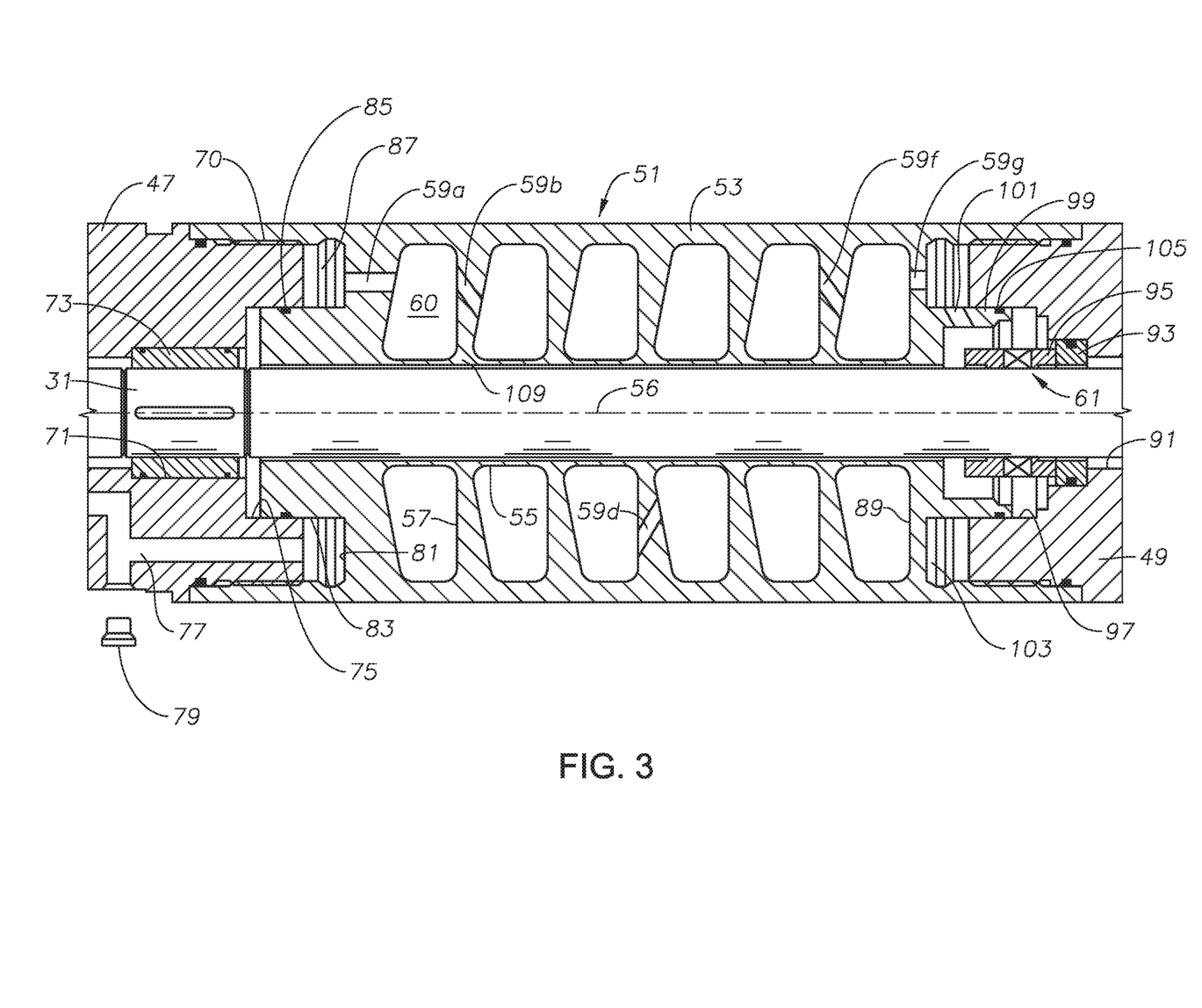
FIG. 3 is sectional view of the labyrinth disc chamber of FIG. 1
Figure 4:
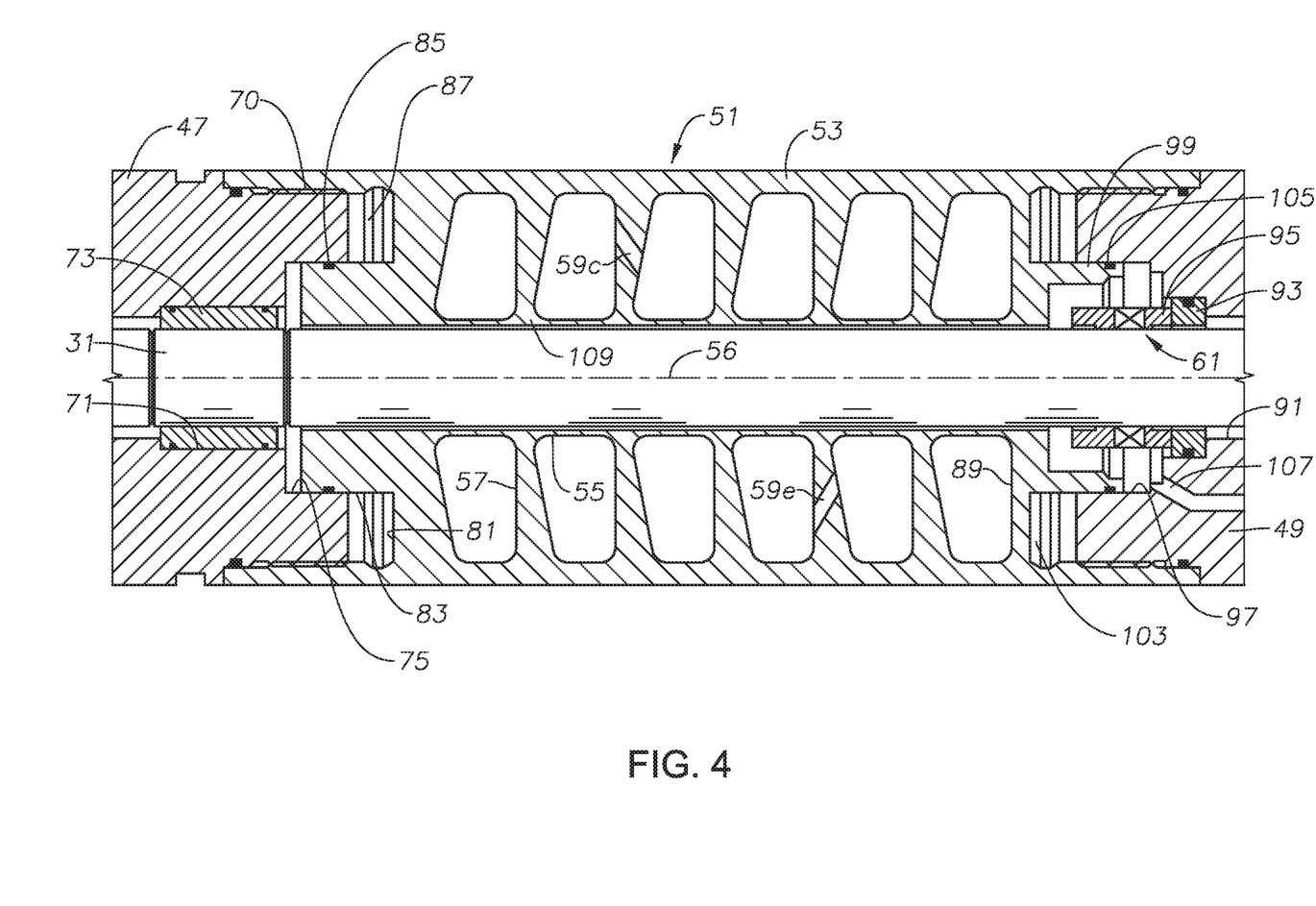
FIG. 4 is a sectional view of the labyrinth disc chamber of FIG. 3 from a different sectional plane.

FIGS. 3 and 4 show seal unit 27 in more detail and in different sectional planes. Forward guide member 47 has external threads 70 that secure to internal threads of labyrinth disc chamber outer wall 53. Forward guide member 47 has a bore 71 through which drive shaft 31 extends. A bearing 73 in bore 71 provides radial support for drive shaft 31, but does not seal around drive shaft 31. Bore 71 has a counterbore 75 extending rearward from bearing 73. Counterbore 75 may have a larger diameter than the forward portion of bore 71. A forward guide member communication passage 77 extends from the forward to the rearward end of forward guide member 47 offset from bore 71. A fill port plug 79 normally closes a fill port for introducing seal unit fluid 43 into communication passage 77 prior to running ESP 11. Communication passage 77 is in fluid communication with the interior of forward bellows 39 (FIG. 2). Forward guide member bore 71 is also in fluid communication with the interior of forward bellows 39.

Labyrinth disc chamber 51 includes a forward disc or bulkhead 81 forward of discs 57, which may be considered to be intermediate discs. A cylindrical forward neck 83 joins and extends forward from forward disc 81. Forward neck 83 is coaxial with axis 56 and extends into close reception within forward counterbore 75. A forward seal ring 85 seals between the outer diameter of forward neck 83 and the inner diameter of counterbore 75. Drive shaft 31 extends through a central opening in forward neck 83.

A forward annular space 87 surrounds forward neck 83 and is bounded by a forward part of outer wall 53, a forward side of forward disc 81 and a rearward end of forward guide member 47. Forward communication passage 77 communicates with disc port 59a in forward disc 81 via forward annular space 87. Forward seal ring 85 prevents direct communication of seal unit fluid 43 in forward guide member bore 71 with the seal unit fluid 43 in forward annular space 87.

Labyrinth disc chamber 51 has a rearward disc 89 that is rearward of intermediate discs 57. Rearward guide member 49 is secured by threads to the rearward end of outer wall 53. Rearward guide member 49 has a bore 91 through which drive shaft 31 extends and is supported by bearings (not shown). Rearward shaft seal 61, if employed, may be located in rearward guide member bore 91. Rearward shaft seal 61 is illustrated to be a mechanical face seal having a stationary base 93 and a rotating runner 95 urged by a spring in a rearward direction against base 93. Forward shaft seal 37 (FIG. 2) may be identical.

Rearward guide member bore 91 may have a counterbore 97 on a forward end. Optionally, a rearward neck 99 extends from rearward disc 89 into a snug engagement with rearward counterbore 97. Neck 99 is a tubular member with a port 101 extending through its side wall. A rearward annular space 103 surrounds rearward neck 99 and is bounded by a rearward part of outer wall 53, the rearward side of rearward disc 89 and the forward side of rearward guide member 49. A disc port 59g in rearward disc 89 communicates labyrinth chamber cavities 60 with rearward annular space 103. The drawings illustrate an optional rearward seal ring 105 between the outer diameter of rearward neck 99 and the inner diameter of counterbore 97. Rearward seal ring 105 adds stability to the engagement of rearward neck 99 with rearward guide member 49, but does not block fluid in rearward annular space 103 from entry into rearward neck 99 in this embodiment.

Rearward guide member 49 has a communication passage 107 offset from rearward guide member bore 91 that leads to the interior of rearward neck 99. Communication passage 107 is in fluid communication with motor lubricant 63 (FIG. 2) in thrust bearing unit 23. Rearward check valve 65 (FIG. 2) is located in rearward guide member communication passage 107. When rearward check valve 65 opens, motor lubricant 63 can flow around rearward shaft seal 61 through rearward neck port 101 into rearward annular space 103. Rearward check valve 65 does not allow reverse flow from rearward annular space 103 into rearward neck port 101.

An annular guide tube clearance 109 exists between drive shaft 31 and the inner wall of guide tube 55. Annular guide tube clearance 109 extends from the forward end of forward neck 83 to the rearward end of rearward neck 99. Guide tube clearance 109 is uninterrupted along its entire length. In this embodiment, there are no ports in guide tube 55 that would directly communicate fluid in guide tube annular clearance 109 with any of the cavities 60.

Labyrinth disc chamber 51 is a unitary, single-piece member, including forward disc 81, forward neck 83, outer wall 53, intermediate discs 57, rearward disc 89, rearward neck 99 and guide tube 55. A known additive manufacturing technique, also call 3-D metal printing, may be used to fabricate labyrinth disc chamber 51 as a monolithic single-piece member. Making these components of labyrinth disc chamber 51 integral with each other greatly reduces the number of parts of seal unit 27 over prior art designs.

Intermediate disc ports 59b, 59c, 59d, 59e, and 59f are illustrated as inclining upward and downward. Also, as mentioned, intermediate disc ports 59b, 59c, 59d, 59e and 59f are spaced at different angular points or coordinates relative to axis 56. An operator will not know in advance the particular rotational orientation of ESP 11 after it reaches the designed depth. Disc ports 59 of adjacent ones of the intermediate discs 57 will be at higher and lower elevations when ESP 11 is horizontal, regardless of the final rotational orientation of ESP 11. A communication flow path for seal unit fluid 43 from forward communication passage 77 leads in an up and down tortuous flow path through intermediate disc ports 59b, 59c, 59d, 59e and 59f and the cavities 60 between. The communication flow path leads out rearward disc port 59g into rearward annular space 103. Any well fluid water leaking into seal unit fluid 43 from forward shaft seal 37 (FIG. 2) must flow upward and downward as it migrates in a rearward direction through labyrinth disc chamber 51. Rearward shaft seal 61 blocks flow of seal unit fluid 43 rearward into rearward guide member bore 91. Rearward check valve 65 (FIG. 2) blocks rearward flow of seal unit fluid 43 through rearward communication passage 107 into thrust bearing unit 23 (FIG. 2).

The present invention described herein, therefore, is well adapted to carry out the objects and attain the ends and advantages mentioned, as well as others inherent therein. While only a few embodiments of the invention have been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

The invention claimed is:
1. A submersible well pump assembly, comprising:
a pump;
a motor;
a labyrinth disc chamber coupled between the pump and the motor, the labyrinth disc chamber having a longitudinal axis and comprising;
a cylindrical chamber outer wall;
a guide tube concentrically located within and radially inward from the chamber outer wall;
a plurality of axially spaced apart discs extending between the guide tube and the cylindrical chamber outer wall, defining cavities between the discs, each of the discs being integrally joined to the guide tube and integrally joined to the cylindrical chamber outer wall, each of the cavities having a cavity outer end defined by the cylindrical chamber outer wall and a cavity inner end defined by the guide tube;
a plurality of disc ports, each of the disc ports extending through one of the discs to communicate fluid between the cavities, the disc ports being at multiple angular locations relative to each other;
a drive shaft extending through the guide tube, the drive shaft having a smaller outer diameter than an inner diameter of the guide tube, defining an annular clearance between an outer diameter of the drive shaft and the inner diameter of the guide tube that extends continuously and uninterrupted from a forward end to a rearward end of the labyrinth disc chamber;
a seal unit fluid in the cavities and in the annular clearance; and wherein
the cylindrical chamber outer wall, the guide tube and the discs comprise a monolithic single-piece member.

2. The assembly according to claim 1, wherein:
the guide tube is free of any ports extending directly from the annular clearance into any of the cavities.

3. The assembly according to claim 1, further comprising:
a rearward communication passage leading from a rearward end of the annular clearance into a rearward one of the cavities, communicating seal unit fluid between the annular clearance and the rearward one of the cavities.

4. The assembly according to claim 1, further comprising:
a forward guide member secured by threads to a forward end of the labyrinth disc chamber;
a forward guide member bore in the forward guide member through which the drive shaft extends;
a forward neck extending from the forward end of the labyrinth disc chamber, the forward neck being a part of the single-piece member and extending into the forward guide member bore; and
a forward seal ring between the forward neck and the forward guide member bore.

5. The assembly according to claim 4, wherein the annular clearance between the drive shaft and the guide tube is in fluid communication with the forward guide member bore.

6. A submersible well pump assembly, comprising:
a pump;
a motor;
a labyrinth disc chamber coupled between the pump and the motor, the labyrinth disc chamber having a longitudinal axis and comprising;
a cylindrical outer wall;
a guide tube concentrically located within the cylindrical outer wall;
a plurality of axially spaced apart discs extending between the guide tube and the cylindrical outer wall, defining cavities between the discs;
a plurality of disc ports, each of the disc ports extending through one of the discs to communicate fluid between the cavities, the disc ports being at multiple angular locations relative to each other;
a drive shaft extending through the guide tube; wherein
the cylindrical outer wall, the guide tube and the discs comprise a monolithic single-piece member;
a forward guide member secured by threads to a forward end of the outer wall, the forward guide member having a forward guide member bore through which the drive shaft extends;
a forward neck extending from a forward one of the discs into the forward guide member bore, the forward neck being part of the monolithic single-piece member;
a forward seal ring between an outer diameter of the forward neck and the forward guide member bore;
a forward end annular space bounded by the rearward end of the forward guide member, the forward one of the discs, the forward neck and the outer wall;
a communication passage extending through the forward guide member offset from the forward guide member bore into the forward end annular space; and wherein
the disc port extending through a forward one of the discs communicates the forward end annular space with a forward one of the cavities.

7. The assembly according to claim 6, further comprising:
a rearward guide member secured by threads to a rearward end of the cylindrical outer wall, the rearward guide member having a rearward guide member bore through which the drive shaft extends;
a rearward neck extending from a rearward one of the discs into the rearward guide member bore, the rearward neck being part of the single-piece member;
a rearward end annular space bounded by the forward end of the rearward guide member, the rearward one of the discs, the rearward neck and the chamber outer wall;
a rearward communication passage extending through the rearward guide member offset from the rearward guide member bore into the rearward end annular space; and wherein
the disc port extending through a rearward one of the discs communicates the rearward end annular space with a rearward one of the cavities.

8. The assembly according to claim 1, wherein:
the discs comprise a forward disc, a rearward disc, and at least one intermediate disc between the forward disc and the rearward disc; the assembly further comprises:
forward and rearward guide members secured by threads to forward and rearward ends of the cylindrical outer wall, each of the forward and rearward guide members having a bore through which the shaft extends;
a forward neck extending from the forward disc into sealing engagement with the bore in the forward guide member;
a rearward neck extending from the rearward disc into engagement with the bore in the rearward guide member; and
wherein the forward neck and the rearward neck are part of the monolithic single-piece member.

9. The assembly according to claim 1, further comprising:
a forward pressure equalizer between the labyrinth disc chamber and the pump;
a forward well fluid port for delivering well fluid to one side of the forward pressure equalizer;
the seal unit fluid being on an opposite side of the forward pressure equalizer; and
a communication path for the seal unit fluid, the communication path extending from the opposite side of the forward pressure equalizer through the disc ports and the cavities of the labyrinth chamber.

10. A submersible well pump assembly, comprising:
a pump;
a motor;
a seal unit coupled between the pump and the motor, the seal unit having a longitudinal axis and comprising:
a forward guide member having a forward guide member bore;
a rearward guide member having a rearward guide member bore;
a labyrinth disc chamber having a chamber outer wall with a forward end secured by threads to the forward guide member, the chamber outer wall having a rearward end secured by threads to the rearward guide member;
a guide tube concentrically located within and radially inward from the chamber outer wall;

a plurality of axially spaced apart discs integrally joined to and extending between the guide tube and the chamber outer wall, defining cavities between the discs, each of the cavities having a cavity outer end defined by the chamber outer wall and a cavity inner end defined by the guide tube;

a plurality of disc ports, each of the disc ports extending through one of the discs to communicate fluid between the cavities, the disc ports being at multiple angular locations relative to each other;

a drive shaft extending through the guide tube, and through the forward guide member bore and the rearward guide member bore;

a guide tube annular clearance between an outer diameter of the shaft and an inner diameter of the guide tube and extending continuously and uninterrupted from the forward guide member to the rearward guide member;

seal unit fluid in the cavities, the guide tube annular clearance and the forward guide member bore;

a rearward communication passage between a rearward end of the annular clearance and a rearward one of the cavities, communicating seal unit fluid in the annular clearance with the rearward one of the cavities; and wherein the chamber outer wall, the guide tube and the discs comprise a monolithic single-piece member.

11. The assembly according to claim 10, further comprising:

a forward guide member communication passage extending through the forward guide member offset from the forward guide member bore; and a forward communication path leading from the forward guide member communication passage into the disc port of a forward one of the discs, the forward communication path being sealed from the forward guide member bore.

12. The assembly according to claim 11, further comprising:

a forward neck extending into the forward guide member bore;

the guide tube annular clearance extending through the forward neck in fluid communication with seal fluid in the forward guide member bore;

a forward seal ring between the forward neck and the forward guide member bore that seals the seal fluid in the forward guide member bore from the forward communication path.

13. The assembly according to claim 10, further comprising:

a shaft bearing in the forward guide member bore;

a counterbore in the forward guide member bore rearward of the shaft bearing;

a forward neck extending from a forward end of the labyrinth disc chamber into the counterbore, the drive shaft extending through the forward neck;

a forward seal ring between an outer diameter of the forward neck and the counterbore; and wherein the forward neck comprises a part of the monolithic single-piece member.

14. The assembly according to claim 10, further comprising:

a forward pressure equalizer between the seal unit and the pump;

a forward well fluid port for delivering well fluid to one side of the forward pressure equalizer;

the seal unit fluid being on an opposite side of the forward pressure equalizer;

a communication path for the seal unit fluid, the communication path extending from the opposite side of the forward pressure equalizer through the ports in the discs and the cavities of the labyrinth chamber; and wherein the guide tube annular clearance is sealed from the communication path at a forward end of the guide tube annular clearance and in fluid communication with the communication path at a rearward end of the guide tube annular clearance.

15. The assembly according to claim 14, further comprising:

a thrust bearing mounted between the seal unit and the motor;

a rearward pressure equalizer connected to a lower end of the motor;

a rearward well fluid inlet port for communicating well fluid to one side of the rearward pressure equalizer;

a motor lubricant on the opposite side of the rearward pressure equalizer, in the motor and in the thrust bearing; and a rearward shaft seal sealing around the shaft in the rearward guide member bore and sealing the seal unit fluid from the motor lubricant.

16. A submersible well pump assembly, comprising:

a pump;

a motor;

a seal unit coupled between the pump and the motor, the seal unit having a longitudinal axis and comprising:

a forward guide member having a forward guide member bore;

a rearward guide member having a rearward guide member bore;

a labyrinth disc chamber having a chamber outer wall with a forward end secured by threads to the forward guide member, the chamber outer wall having a rearward end secured by threads to the rearward guide member;

a guide tube concentrically located within and radially inward from the chamber outer wall;

a plurality of discs extending between the guide tube and the chamber outer wall, defining cavities between the discs, each of the discs being integrally joined to the guide tube and integrally joined to the chamber outer wall, each of the cavities having a cavity outer end defined by the chamber outer wall and a cavity inner end defined by the guide tube;

a plurality of disc ports, each of the disc ports extending through one of the discs to communicate fluid between the cavities, the ports being at multiple angular locations relative to each other;

a forward neck extending forward from a forward one of the discs into the forward guide member bore;

a forward seal ring between an outer diameter of the forward neck and the forward guide member bore;

a drive shaft extending through the guide tube, the forward neck, and through the forward guide member bore and the rearward guide member bore;

a guide tube annular clearance between an outer diameter of the shaft and an inner diameter of the guide tube, the guide tube annular clearance extending continuously and uninterrupted from a forward end of the forward neck through a rearward end of the guide tube;

a seal unit fluid in the cavities, the forward guide member bore and the guide tube annular clearance; wherein the seal unit fluid in a forward end of the guide tube annular clearance is in direct communication with the seal unit fluid in the forward guide member bore and sealed from a forward one of the cavities by the forward seal ring; and the chamber outer wall, the guide tube, the discs and the forward neck comprise a monolithic single-piece member.

17. The assembly according to claim 16, further comprising:

a rearward neck extending rearward from a rearward one of the discs into the rearward guide member bore; wherein a rearward end of the annular clearance is in direct fluid communication with the rearward guide member bore; and the rearward neck is a part of the monolithic single-piece member.

18. The assembly according to claim 16, further comprising:

a forward pressure equalizer between the seal unit and the pump;

a forward well fluid port for delivering well fluid to one side of the forward pressure equalizer;

a forward communication path for communicating seal unit fluid directly between a forward one of the cavities and an opposite side of the forward pressure equalizer;

a thrust bearing unit mounted between the seal unit and the motor;

a rearward pressure equalizer connected to a rearward end of the motor;

a rearward well fluid inlet port for communicating well fluid to one side of the rearward pressure equalizer;

a motor lubricant on the opposite side of the rearward pressure equalizer, in the motor and in the thrust bearing; and a rearward shaft seal sealing around the shaft in the rearward guide member bore to prevent seal unit fluid from migrating into the thrust bearing.

19. The assembly according to claim 18, further comprising:

a rearward check valve located in a rearward check valve port in the rearward guide member that allows motor lubricant in the thrust bearing unit to flow into a rearward end of the guide tube annular clearance if the pressure of the motor lubricant in the thrust bearing unit exceeds the pressure in the guide tube annular clearance by a selected amount.

* * * * *